United States Patent [19]

Goddard

[11] 4,316,768

[45] Feb. 23, 1982

[54] PULSE FREE STOCK SCREEN AND COMBINATION PUMP

[75] Inventor: Denis A. Goddard, Beloit, Wis.

[73] Assignee: Beloit Corporation, Beloit, Wis.

[21] Appl. No.: 169,950

[22] Filed: Jul. 18, 1980

[51] Int. Cl.³ .......................... D21D 5/02; D21F 1/00
[52] U.S. Cl. .................................... 162/336; 162/341; 162/380; 209/250; 209/273; 209/305; 209/306
[58] Field of Search ................. 162/55, 341, 380, 336, 162/342; 209/250, 273, 305, 306

[56] References Cited

U.S. PATENT DOCUMENTS 3,446,354 5/1969 Skardal ............................ 209/273
3,726,401 4/1973 Bolton et al. ..................... 209/273

OTHER PUBLICATIONS

"Technology as it should be," Swedish Paper Journal, Mar. 10, 1979.

Primary Examiner—Peter Chin
Attorney, Agent, or Firm—Hill, Van Santen, Steadman, Chiara & Simpson

[57] ABSTRACT

A paper machine screening apparatus generally includes a centrifugal pump member mounted for rotation about the axis of a tubular screen plate. A delivery passageway extends concentrically about the pump impeller for receiving pumped stock flow and includes an annular axially extending passage formed between a ribbed hub surface of the pump and the screen. Flow through the screen is passed from the screening apparatus to headboxes. Downstream of the annular passage is an end cavity for receiving particles unable to pass through the screen holes which are washed into the end cavity by the axial flow through the annular passage. The ribbings on the hub surface serve to agitate the stock flow to raise pressure forces tending to force flow out through the screen holes.

10 Claims, 2 Drawing Figures

PULSE FREE STOCK SCREEN AND COMBINATION PUMP

BACKGROUND OF THE INVENTION

1. Field of the Invention

The invention relates to screening machines of the type employed in separating over-size aqueous fibrous suspensions of wood pulp or the like from stock used in papermaking.

2. The Prior Art

Screening machines are used in the papermaking process for filtering liquid slurry stock before it flows to headboxes to be dewatered to form a web. In many screening machines, a hydrofoil or other moving impeller is supported within a tubular screen plate for rotation about the axis thereof. Incoming stock enters at one end of the tubular screen under pressure from a stock supply pump means. The liquid flows along the screen plate and through the screen holes toward the opposite end of the screen tube. Acceptably sized solid particles in the slurry stock pass through the screen and onto the headboxes. Unacceptably over-sized particles do not pass through the tubular screen and are retained in the screening machine for later removal. The impeller typically has some kind of spaced protuberances or foils thereon to assist the screening operation by creating positive pulses to direct the desired material through the screen. The foils generally extend substantially throughout the entire effective length of the screen and are passed adjacently over the surface of the screen.

In screening machines of the type referred to, pressure pulsations caused by the impeller are necessary to the satisfactory operation of the screen; however, they introduce corresponding pressure pulsations in the stock delivery to the headboxes. Such pressure pulsations disturb uniform distribution of the stock and have an adverse effect on flow of the stock through slice openings leading onto the web-forming surfaces. For satisfactory high speed operation and good web formation, it is essential that the pulse fluctuations be substantially eliminated. Also, to induce stock flow through the screening machine and onto the headboxes, screening machines of the type referred to utilize stock pump means at a separate location along the liquid slurry line.

The present invention concerns an entirely different construction for a screening machine in which pulse fluctuations in stock flow due to the rotation of foil members in the screening machine are effectively reduced or eliminated. Further, the inventive construction eliminates the need for a separate supply pump location, providing a more compact arrangement for papermaking apparatus.

SUMMARY OF THE INVENTION

A papermaking machine screen apparatus for screening solid particles from liquid stock flowing to a headbox generally comprises a housing containing a cylindrical tubular screen and a centrifugal pump assembly supported for rotation about the axis of the screen. A supply of stock is passed radially from the pump into an annular delivery duct extending generally to a passage between the screen and the pump assembly so that the suspended material continuously washes along the screen. Across from the screen, the pump assembly has an outer surface formed with raised surfaces, such as ribbings. The raised surfaces create eddies in the flow along the screen, thereby reducing the velocity of the liquid and increasing its pressure. Axially downstream of the screen is an annular reject space where over-size stock collect. The reject space is purged by the opening of a throttle valve in fluid communication therewith.

DESCRIPTION OF THE PREFERRED EMBODIMENT

Figure 1:
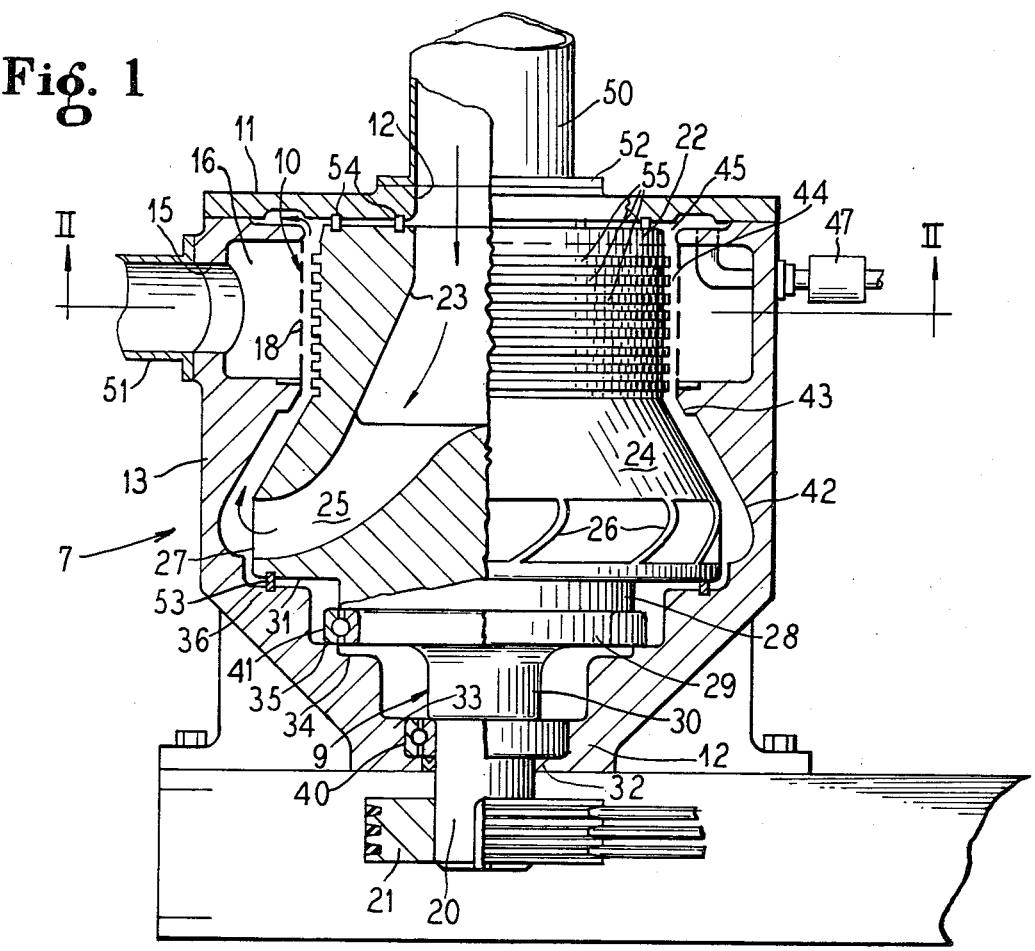
FIG. 1 is a side elevational view, partly in cross-section, of a screening apparatus according to the present invention.
Figure 2:
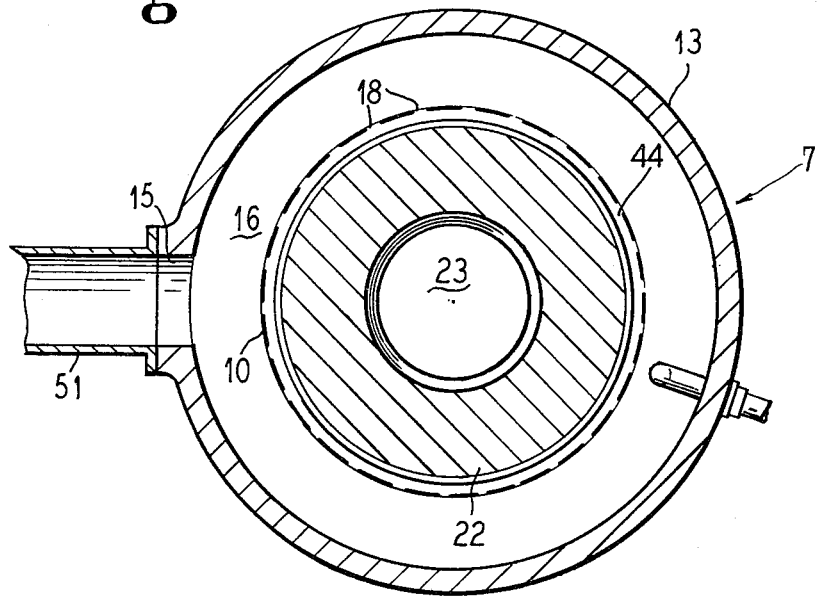
FIG. 2 is a cross-sectional view taken along the lines II—II of FIG. 1.

A screening apparatus 7 is used to separate solid particles in liquid slurry stock before the stock is passed onto papermaking headboxes. The apparatus generally comprises a housing 8 containing a centrifugal pump assembly 9 supported for rotation about the axis of an annular screen plate 10 contained in the housing. The housing is provided with a detachable (such as by screws, not shown) top plate 11, a base, and a sidewall casing 13. The top plate has a centrally located inlet opening 14; and the sidewall casing is formed with an outlet opening 15.

Within the housing, the outlet 15 communicates with a generally annular manifold volume 16 formed in the sidewall casing 15 adjacent the top plate 11. The tubular screen plate 10 is provided with uniformly distributed screen holes 18 and extends across the radially inwardly open end of the manifold.

The pump assembly 9 is of a generally elongated one-piece construction having a vertical drive shaft 20 extending outside the bottom of the casing 11. The lower end of the drive shaft is fitted with a power take-off wheel 21 for connection with a belt or other rotary drive transmission. The upper end of the pump is a cylindrical hub portion 22 formed with a centrally disposed intake channel 23 so as to be coaxial with the inlet opening 14. The intake 23 extends through the hub 22 into an impeller section 24 at which the outer surface of the pump takes on relatively larger cross-sections than that of the hub. An annular array of radial passages 25, formed by spaced-apart centrifugal pump vanes 26, extend from the downstream end of the inlet channel 23 to radially facing discharge openings 27 on the outer surface of the pump. Pump fluid flows axially toward the impeller where it is deflected and flows out through the discharge openings 27 between the vanes. As those skilled in the art will readily appreciate, the centrifugal pump 19 delivers a steady, rather than pulsating, flow.

Beneath the impeller section 24 are a series of inwardly stepped cylindrical portions 28, 29, and 30 connecting the bottom radial face surface 31 of the impeller portion to the drive shaft 20. Enclosing the stepped portions at the lower end of the sidewall casing is a series of annular shelves 32, 33, 34, 35, and 36 built into the casing with radial surfaces facing across from corresponding radial surfaces of the pump stepped portions. Thrust bearing means 40 and 41 fit between such facing surfaces for rotational support of the pump.

Receiving discharge flow from the pump impeller section is a discharge duct 42 formed as a cavity in the sidewall casing 13. The discharge cavity 42 is generally concentric about the outer surface of the impeller portion 24 at a generally even radial spaced-apart distance therefrom so as to maintain a fairly constant velocity in the pump discharge flow. The cavity 42 is narrowed at a downstream end 43 into communication with a flow passage space 44 of generally even radial width between the hub 22 and the screen 10. Axially beyond the space 44, in the direction of pump discharge flow, is an annular end cavity 45. A flow channel 46 extends out from the housing 8 for passing fluid from the end cavity 45. A throttle valve is positioned in the channel 46 for relative opening to relieve the end cavity 45.

The screening apparatus 7 is placed in flowthrough connection in the papermaking system by means of upstream and downstream ducts, 50 and 51, respectively. The upstream duct 50 communicates with a source of liquid stock and is connected to the inlet opening 14. The supply duct 50 is formed with an attachment plate member 52 which may be fixedly or detachably secured to the removable top plate 13 about the inlet opening 12. The downstream duct 51 conducts discharge flow from the outlet opening 15 and to papermaking headboxes (not shown) for dewatering of the stock.

Seal means such as piston rings 53 and 54 are located beneath the bottom radial surface 31 of the pump impeller and above the upper radial surface of the pump, respectively. These seal means serve to seal fluid flow in the respective cavities and channels through the screening machine 10.

Across from the screen 10, there are raised surfaces or ribs 55 formed on the outer surface of the hub 22. These surfaces 55 may be in the form of screw thread ribbings running annularly about the hub 22. The edges and recesses of the ribbings create eddies and other disturbances in the flow in passage 44, such that the velocity of the flow therein decreases and pressure increases. The increased pressure is generally continuous and tends to force fluid and suspended particles out through the screen holes 18 into the discharge manifold and duct.

The operation of the paper machine screen apparatus 7 is as follows. Stock, having wood pulp or other fibrous material in liquid slurry suspension, is drawn into the intake 23 of the centrifugal pump 9 and propelled into the discharge duct 42 within the sidewall casing 15. The pumped stock then passes into the passage 44 from which it flows outward through the screen 10 into an accepts zone. Particles too large to pass through the screen holes 18 are washed towards the end cavity 45, which acts as a rejects zone, due to the axial flow of pressure fluid in the delivery passageways. The oversize particles are unable to mat against the screen and a screen cleaning effect is achieved. The particles unable to pass through the screen collect in the rejects zone until the throttle valve 47 is opened to purge the system of debris. Stock flow in the accepts zone passes into the discharge duct 51 for dewatering at the headboxes. Stock discharge from the screening apparatus is generally continuous and pulse-free.

It will be appreciated that, although the apparatus as illustrated is of a vertically positioned type, the apparatus may be disposed horizontally.

Although various minor modifications may be suggested by those versed in the art, it should be understood that I wish to embody within the scope of the patent warranted hereon all such modifications as reasonably and properly come within the scope of my contribution to the art.

I claim as my invention:

1. A pulse-free screening machine for separating solid particles suspended in liquid slurry stock flowing to a headbox of a papermaking machine comprising:
   a hollow housing having an inlet opening connected to a source of stock and an outlet opening leading to said headbox,
   a centrifugal pump assembly mounted for rotation in said housing, said pump assembly having a generally tubular hub portion formed with a central passage for receiving a flow of stock from said inlet opening and an impeller section formed with a plurality of generally radially extending passages leading from said central passage to discharge openings communicating with said outlet opening,
   a cylindrically tubular screen coaxial with the axis of rotation of said pump assembly and extending concentrically about said hub portion in fluid communication with said discharge openings on one side and with said outlet opening on the other side for screening solid particles,
   annular delivery duct means between said pump assembly and said housing for directing flow from said discharge openings to said outlet opening, said delivery duct means including a flow space between said screen and said hub portion in which flow is generally axial along said screen, and
   an end cavity in said housing above said outlet opening for receiving solid particles unable to pass through said screen.

2. The screening machine of claim 1, further comprising:
   rib surfaces formed on said hub portion for agitating flow in said flow space.

3. The screening machine of claim 2, wherein said rib surfaces comprise a screw thread ribbing about said hub portion.

4. The screening machine of claim 1, further comprising:
   a removable end wall to said housing to permit servicing.

5. The screening machine of claim 1, further comprising:
   a channel extending from said housing for passing flow from said end cavity and
   a throttle valve positioned in said channel for relative opening and closing to purge particles from said end cavity.

6. The screening machine of claim 1, wherein a drive shaft for said pump assembly extends exteriorly of said housing for engagement with a belt drive means.

7. Apparatus for pulse-free separation of pulp particles suspended in a stock slurry flow to a headbox of a papermaking machine comprising:
   a hollow housing having an inlet opening connected to a source of stock slurry and an outlet opening leading to said headbox,
   a tubular hub portion mounted for rotation in said housing and formed with a central passage for conducting a flow of stock slurry therethrough from said inlet opening,
   a pump impeller means connected for rotation with said hub portion in said housing and having pump passage means for drawing said flow from said hub portion and passing said flow to said outlet opening,
   a screen extending about said hub portion in fluid communication with said pump passage means on one side and said outlet opening on the the other side for screening relatively large pulp particles, delivery duct means for directing flow from said pump impeller means to said outlet opening, including a flow space between said screen and said hub portion, an end cavity in said housing above said outlet opening for receiving said pulp particles unable to pass through said screen, and rib surfaces formed on said hub portion for agitating flow in said flow space.

8. The apparatus of claim 7, wherein said pump impeller means is formed as a centrifugal pump and said pump passage means comprise a plurality of generally radially extending passages.

9. The apparatus of claim 7, wherein said screen and flow space extend concentrically about said hub portion.

10. The apparatus of claim 9, wherein said rib surfaces comprise a screw thread ribbing about said hub portion.

* * * * *